Figure 1:
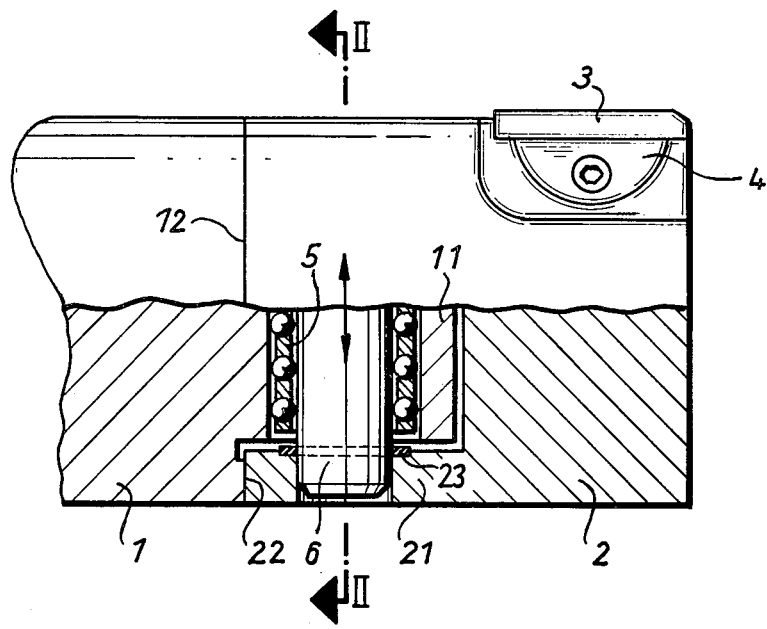

United States Patent [19]

Kress et al.

[11] 4,200,418

[45] Apr. 29, 1980

[54] FLOATING REAMER

[75] Inventors: Dieter Kress, Aalen; Friedrich Häberle, Lauchheim, both of Fed. Rep. of Germany

[73] Assignee: Mapal Fabrik fur Prazisionswerkzeuge KG, Aalen, Fed. Rep. of Germany

[21] Appl. No.: 907,599

[22] Filed: May 19, 1978

Related U.S. Application Data

[63] Continuation-in-part of Ser. No. 738,327, Nov. 2, 1976, Pat. No. 4,102,594.

[30] Foreign Application Priority Data

Nov. 4, 1975 [DE] Fed. Rep. of Germany ....... 2549325

[51] Int. Cl.² .................... B23B 47/00; B23B 31/02
[52] U.S. Cl. .................... 408/143; 408/147; 408/226; 408/238; 279/16
[58] Field of Search .................. 408/127, 714, 143, 48, 408/229, 226, 147, 238; 279/1 J, 16; 10/89 F

[56] References Cited

U.S. PATENT DOCUMENTS

| 2,108,699 | 2/1938 | Walther | 408/127 |
| 2,829,503 | 4/1958 | Hayes | 279/16 X |
| 4,111,442 | 9/1978 | Wawrzyniak | 408/238 X |

FOREIGN PATENT DOCUMENTS

664304 8/1938 Fed. Rep. of Germany.
2436501 12/1976 Fed. Rep. of Germany.

Primary Examiner—Travis S. McGehee
Attorney, Agent, or Firm—Toren, McGeady and Stanger

[57] ABSTRACT

The cutting head and shank of a floating reamer are connected for joint rotation about the shank axis and limited radial movement of the head on the shank by a reduced axial end portion of the shank being spacedly enveloped by an annular axial flange on the head and fastened to the flange by a pin diametrically passing through a bore in the end portion of the shank which is lined with a tubular ball bearing. The clearance between the flange and the end portion of the shank defines the available radial head movement.

2 Claims, 2 Drawing Figures

FLOATING REAMER

This application is a continuation-in-part of our co-pending application Ser. No. 738,327, filed Nov. 2, 1976, and now U.S. Pat. No. 4,102,594, issued July 25, 1978.

This invention relates to machine tools, and particularly to a floating reamer having a shank and one or more cutting blades on its cutting head, the head being capable of limited movement on the shank transverse to the axis of shank location.

The elements of our earlier invention which guide the cutter head transversely on the shank and transmit angular movement from the shank to the cutter head, are exposed. While the reamer of our earlier invention has been found to operate efficiently under many operating conditions, it has been found that the exposed guide elements may be fouled by particulate pollutants in the ambient atmosphere, particularly by fine particles of the material being reamed, so that the transverse movement of the head on the shank is frictionally impeded, and the precision of the reaming action is unfavorably affected.

It is an important object of this invention to provide a floating reamer incorporating basic features and advantages of our earlier invention in which the shank and cutting head are connected by elements protected from the ambient atmosphere.

With this object and others in view, the invention provides either the shank member or the cutting head member of the reamer with an annular, axially projecting flange spacedly enveloping a reduced, axially terminal part of the other member which is formed with an elongated bore transverse to the axis of rotation. A connecting pin is longitudinally movable in the bore and has two longitudinal end portions received in respective recesses of the flange.

Figure 2:
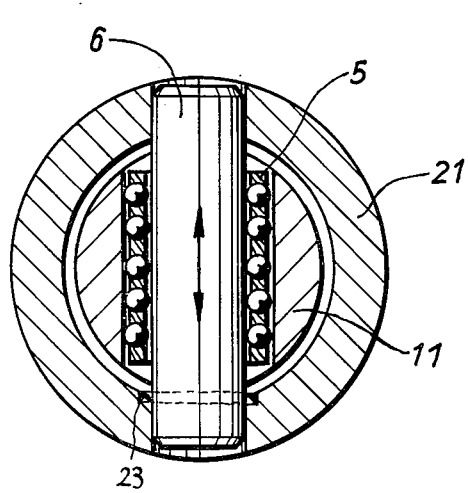

Other features, additional objects, and many of the attendant advantages of this invention will readily be appreciated as the same becomes better understood by reference to the following detailed description of a preferred embodiment when considered in connection with the appended drawing in which:

FIG. 1 shows a reamer of the invention in fragmentary side elevation and partly in section; and FIG. 2 illustrates the reamer of FIG. 1 in front-elevational section on the line II—II of FIG. 1.

The drawing shows an embodiment of this invention only to the extent needed for an understanding of the features which distinguish this invention from the disclosure of the aforementioned earlier application.

The shank 1, of which only the cylindrical part remote from an associated chuck (not shown) is illustrated has a radially reduced, frontal end portion 11 which is received with much radial clearance in a cavity of the cutting head 2 axially open in a rearward direction and radially bounded by an annular, axial, integral flange 21 of the head 2. A planar, annular, radial end face 22 of the flange 21 is radially movable on a corresponding shoulder face 12 of the shank which circles the reduced shank portion 11. Two diametrically opposite cutting blades 3, of which only one is seen in the drawing, are secured on the cutting head 2 by respective clamping jaws 4 as is more fully described in our earlier application.

A diametrical bore in the reduced shank portion 11 is lined by a tubular antifriction bearing 5 consisting of a cage and several annular rows of bearing balls making rolling point contact with the cylindrical surface of a pin 6. The pin projects diametrically from the reduced shank portion 11, and its two longitudinal end portions are fixedly fastened in respective recesses or bores in the flange 21 in sealing engagement.

The dimensions of the flange 21 and the reduced shank portion 11 are such that their radially opposite annular faces define therebetween an annular gap in the position seen in FIG. 2. The radial movement of the cutting head 1 on the shank 2 from the position of FIG. 2 is limited to the width of the gap.

To prevent noise and wear at the end of each limited radial head movement, a ring 23 of synthetic rubber is partly recessed in the inner, annular face of the flange 21 about each end of the pin 6.

In assembling the reamer of the invention, the bearing 5 is mounted in the transverse bore of the reduced shank portion 11, and the latter portion is introduced into the cavity of the flange 21 in alignment of the bearing axis with the two bores in the flange in which the pin 6 is not yet installed. The pin, thereafter is introduced through one of the radially open recesses into the illustrated position and fastened to the flange 21 in any convenient manner. Adhesive fastening, soldering, welding or a shrink fit may be resorted to in an obvious manner. A lubricant may be introduced, if so desired, prior to insertion of the pin.

The elements connecting the shank 1 and head 2 thereafter are safely sealed against contamination by particulate contaminants if the pin 6 and the ball bearing 5 are coordinated precisely enough to maintain an adequate seal between the end face 22 and the shoulder face 12.

It should be understood of course, that the foregoing disclosure relates only to a preferred embodiment of the invention, and that it is intended to cover all changes and modifications of the invention herein chosen for the purpose of the disclosure which do not constitute departures from the spirit and scope of the invention set forth in the appended claims.

What is claimed is:

1. In a floating reamer including
   a shank member having a longitudinal axis, said shank member being rotatable about said longitudinal axis,
   a head member including cutting means thereon operatively mounted upon said shank member, and
   connecting means mounting said head member on said shank member for joint rotation about said longitudinal axis, the improvement wherein said connecting means comprise:
      a terminal end portion having a generally cylindrical outer wall extending from an end of one of said head member and said shank member;
      an annular wall having a generally cylindrical inner surface extending from the other of said head member and said shank member;
      said terminal end portion extending to within said annular wall with said cylindrical outer wall of said terminal end portion surrounded by said cylindrical inner surface of said annular wall;
      said annular wall and said cylindrical outer wall being dimensioned to define an annular radial gap therebetween to enable relative movement between said head member and said shank member radially of said longitudinal axis;

wall means defining a bore extending completely through said terminal end portion radially of said longitudinal axis;

a pin extending through said bore radially beyond said cylindrical outer wall of said terminal end portion;

antifriction roller bearing means operatively mounted between said pin and said wall means defining said bore; and means fixedly mounting said pin in said annular wall;

said roller bearing means being snugly fitted between said pin and said wall means to enable said radial relative movement between said head member and said shank member while preventing axial play therebetween in the direction of said longitudinal axis; and abutment wall means maintained in abutting engagement between said head member and said shank member by said connecting means, said abutment wall means being arranged such that the abuting pressure therebetween is increased by forces tending to move said head member and said shank member toward each other.

2. A reamer according to claim 1 further including resilient means between said pin and said annular wall for elastically damping said radial relative movement between said shank member and said head member.

* * * * *